US009483395B2

(12) United States Patent
Sreekandath et al.

(10) Patent No.: US 9,483,395 B2
(45) Date of Patent: Nov. 1, 2016

(54) ASYNCHRONOUS BAD BLOCK MANAGEMENT IN NAND FLASH MEMORY

(75) Inventors: Mahesh Sreekandath, Kerala (IN); Saugata Das Purkayastha, Bangalore (IN)

(73) Assignee: ST-ERICSSON SA, Plan-les-Ouates (CH)

( * ) Notice: Subject to any disclaimer, the term of this patent is extended or adjusted under 35 U.S.C. 154(b) by 678 days.

(21) Appl. No.: 13/700,460

(22) PCT Filed: Jun. 1, 2011

(86) PCT No.: PCT/EP2011/059125
§ 371 (c)(1),
(2), (4) Date: Apr. 10, 2013

(87) PCT Pub. No.: WO2011/151406
PCT Pub. Date: Dec. 8, 2011

(65) Prior Publication Data
US 2013/0205072 A1 Aug. 8, 2013

(30) Foreign Application Priority Data

Jun. 2, 2010 (IN) .......................... 1294/DEL/2010

(51) Int. Cl.
G06F 13/26 (2006.01)
G06F 12/02 (2006.01)
G06F 12/08 (2016.01)
(52) U.S. Cl.
CPC ....... *G06F 12/0246* (2013.01); *G06F 12/0804* (2013.01); *G06F 2212/7203* (2013.01)
(58) Field of Classification Search
CPC ................... G06F 12/0246; G06F 2212/7203; G06F 11/1044; G06F 3/064; G06F 2212/7211; G06F 2212/2022; G06F 13/1673; G06F 3/0679; G06F 2212/683; G06F 12/0868; G06F 3/0659; G06F 3/0656; G06F 12/0815; G06F 12/00; G06F 3/061; G06F 12/0871; G06F 12/0875; G06F 13/4239; G06F 2003/0691; G06F 2003/0697; G06F 2009/45579; G06F 9/544; G06F 3/0619; G06F 11/073; G06F 11/1048; G06F 11/2069; G06F 17/30082; G06F 17/30132; G06F 17/30117
See application file for complete search history.

(56) References Cited

U.S. PATENT DOCUMENTS

2008/0263556 A1* 10/2008 Zoll ................... G06F 11/3409
                                                        718/104
2009/0222617 A1   9/2009 Yano et al.
(Continued)

FOREIGN PATENT DOCUMENTS

EP          1 619 579 A2    1/2006

OTHER PUBLICATIONS

International Search Report issued in corresponding International application No. PCT/EP2011/059125, mailing date Oct. 10, 2011.

*Primary Examiner* — David X Yi
*Assistant Examiner* — Candice Rankin
(74) *Attorney, Agent, or Firm* — Patent Portfolio Builders PLLC

(57) ABSTRACT

Methods for receiving data from a file system and storing it in a flash storage medium, wherein a bad block management process comprises queuing, at a bad block manager, one or more write requests, and receiving data associated with each of the one or more write requests and storing the received data in the bad block manager buffer; and performing cache management of data in the bad block manager buffer and subsequently returning a success status to the file system; and executing the one or more queued write requests in a separate task, wherein the executing comprises programming the received data to the flash storage medium during the bad block management process. Corresponding devices are also provided.

16 Claims, 7 Drawing Sheets

(56) References Cited

U.S. PATENT DOCUMENTS

| | | | | |
|---|---|---|---|---|
| 2009/0292865 A1* | 11/2009 | Hong | | 711/103 |
| 2010/0017556 A1 | 1/2010 | Chin et al. | | |
| 2010/0082890 A1* | 4/2010 | Heo | | G06F 12/0246 |
| | | | | 711/103 |
| 2011/0082985 A1* | 4/2011 | Haines et al. | | 711/154 |

* cited by examiner

ASYNCHRONOUS BAD BLOCK MANAGEMENT IN NAND FLASH MEMORY

FIELD OF THE INVENTION

The present invention in general, relates to storage devices and more particularly to a NAND Flash.

DESCRIPTION OF THE RELATED ART

Generally, the NAND memory or variants of NAND memory are commonly known to be used as storage devices on embedded platforms. As known in the state of the art, the NAND flash is divided into blocks and blocks in turn are divided into pages. Some part within a block is reserved for some spare bytes on a per page basis to store the ECC (error correction code) and some other metadata of the file system. Each block of NAND flash has limited program or erase cycle. Hence, software using NAND flash ensures that the program or erase cycle is evenly distributed across all the blocks in NAND flash to ensure that NAND flash has maximum life time. Such technique is generally known as wear levelling.

The NAND flash may also have bad blocks. NAND flash manufacturer does not guarantee any reliability of the data stored in bad blocks. NAND flash manufacturer guarantees that when the program or erase cycle is below the maximum allowed program or erase cycle of NAND, only a certain percentage of blocks may become bad. A NAND block becomes bad, when a program or erase operation on the block fails.

Apart from wear levelling and bad block management, the data stored in NAND flash pages may encounter bit flips. So, the data stored in the NAND flash pages need to be protected with ECC. For single level cell NAND, 1 bit ECC is sufficient, while for multi level cell NAND, 4 bit ECC or even higher ECC is required.

A storage architecture using NAND is illustrated in FIG. 1. The File system is responsible for wear levelling and file management within the NAND flash. The file system provides POSIX compliant file API to applications. A Bad block manager is responsible for bad block management and provides read, write, erase Application Programming Interface (API) to file system. The Bad block manager handles any program or erase error from a driver as bad block and copy the pages from bad block to a good block. The driver is responsible for implementing a NAND protocol as suggested by a NAND manufacturer. The driver layer provides read, write, and erase API to the bad block manager.

The most common method of the bad block management involves reserving a group of good blocks and replacing the bad blocks, which are encountered at run time with the reserved good blocks. The other method of bad block management involves skipping the bad blocks, which are encountered and using the next good block available. All the known bad block management system/algorithms are synchronous. Hence the bad block management systems blocks the file system till the write, read or erase request is handled. Any bad block occurred during the write or erase request is handled in the context of the file system.

In some implementation, the bad block manager is part of the file system. In some other implementation, the bad block manager is part of the NAND driver.

FIG. 2 illustrates the sequence of actions which happens when an application copies a file from a MMC/SD card to the NAND.

With higher NAND capacity the NAND programming time is increased. This slows down the write throughput at application. The first known solution to the problem is by introducing a queue buffer between the application and the file system. FIG. 3 illustrates the sequence of action done when copying a buffer from MMC or SD to NAND.

With the existing solution, there is no good overlap between MMC read, file system operation and NAND write. Typically, on a 52 MHz clock with 4 bit MMC, the read for a 2 KB page happens in ~125 µs. The overhead of the file system during write (e.g. searching for a free page, updating meta data etc) and the driver overhead of copying the buffer to non-cacheable region, during write is ~100 µs. The overhead of the NAND transfer and programming for 2 KB pages is ~400 µs. In the existing solution, ~125 µs time spent in MMC read is overlapped with 500 µs of the file system overhead and the NAND programming.

The subject matter disclosed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

The features of the present invention will become better understood when the following description is read with reference to the accompanying drawings, wherein.

DISCLOSURE OF THE INVENTION

Figure 1:
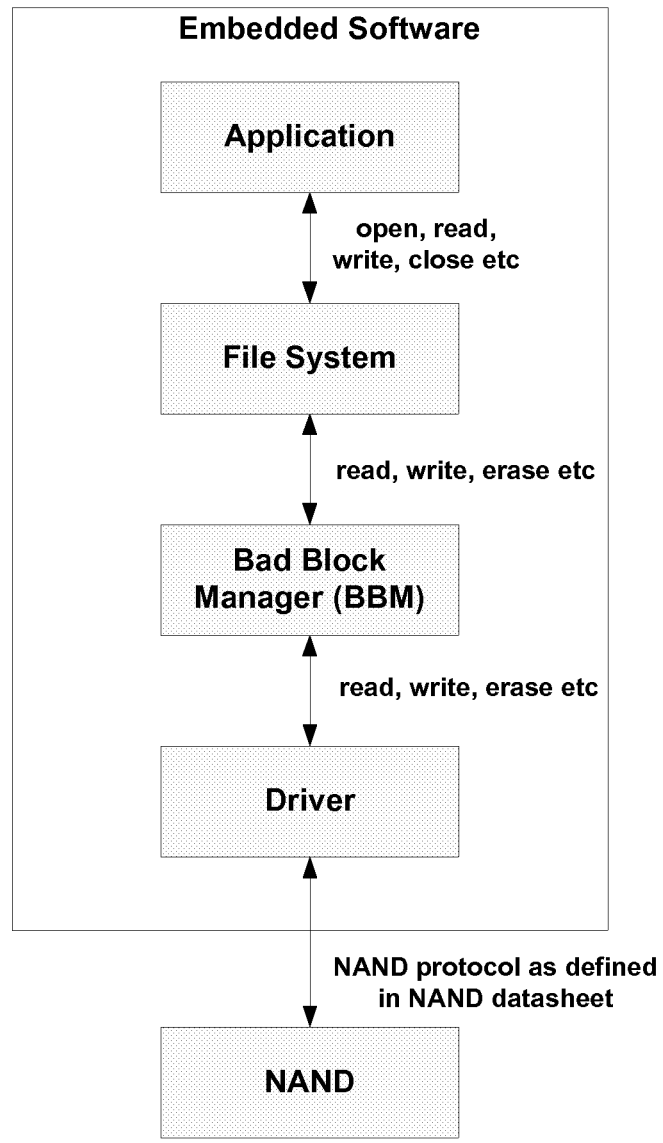
FIG. 1 illustrates a known storage architecture using NAND.
Figure 2:
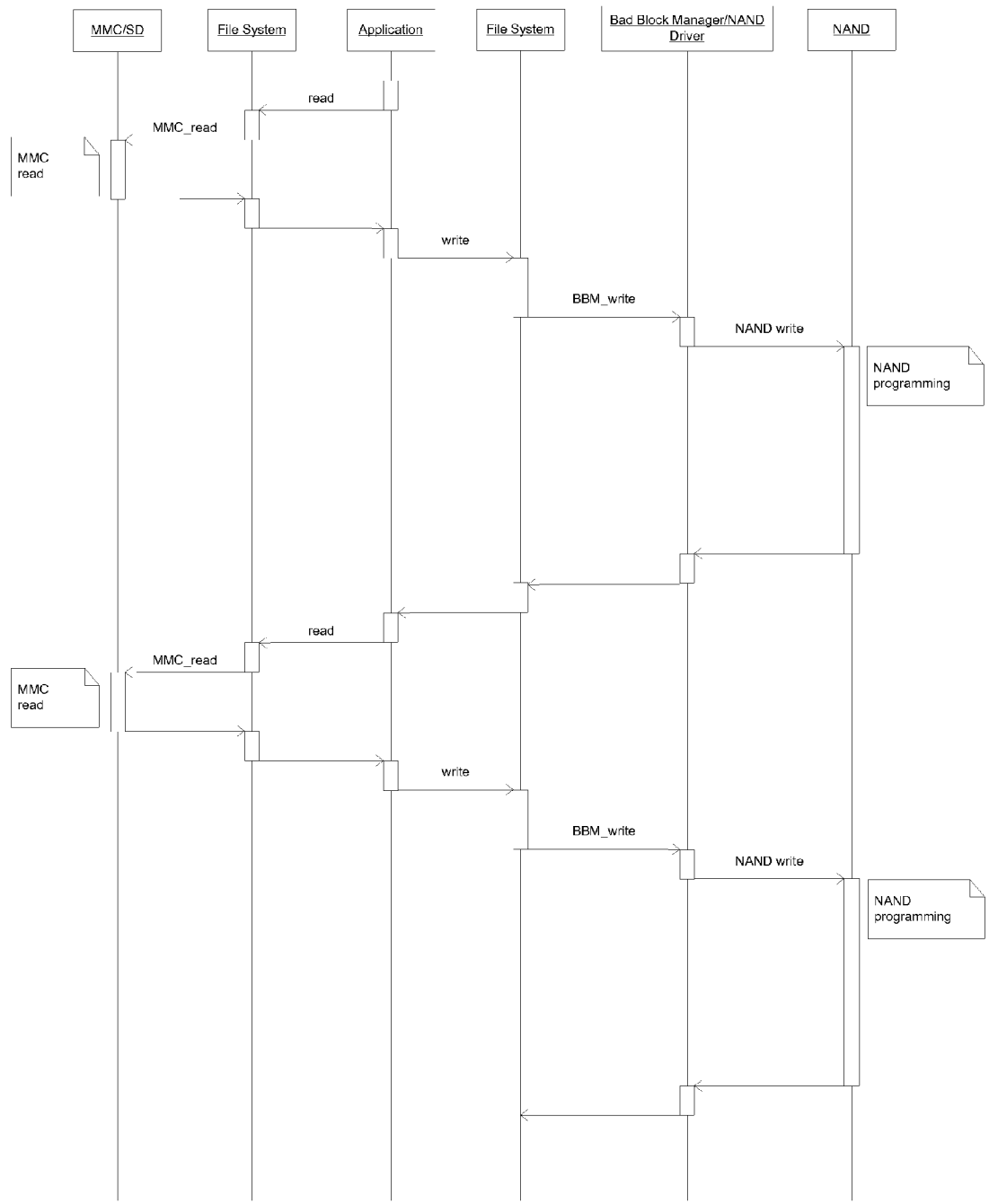
FIG. 2 illustrates a known sequence chart during a write operation on NAND storage.
Figure 3:
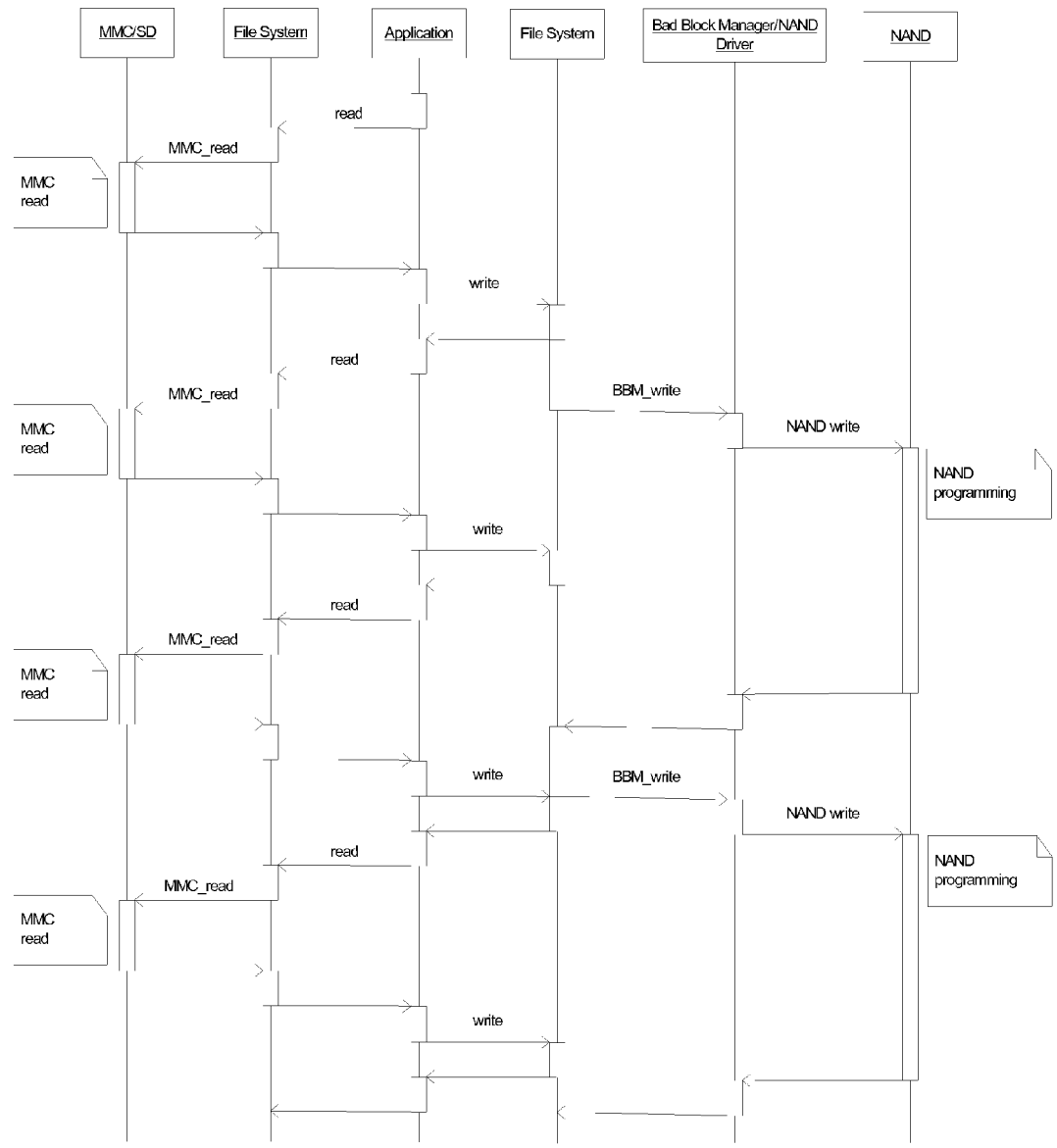
FIG. 3 illustrates a known sequence chart during write with queue between an application and a file system.
Figure 4:
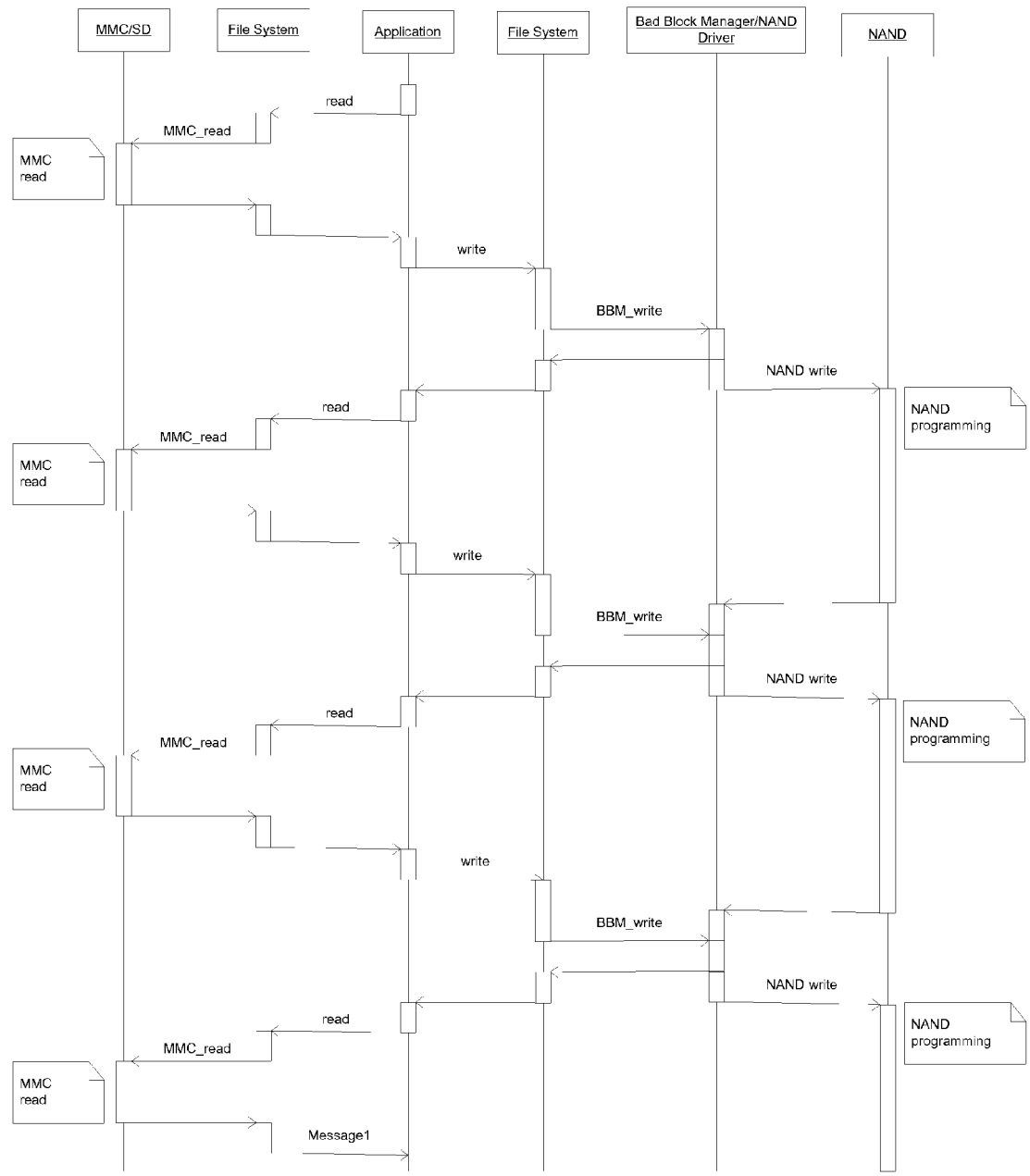
FIG. 4 illustrates a sequence of actions taken when transferring data from MMC to NAND flash according to an embodiment of the present invention.

FIG. 4 illustrates a sequence of actions taken when transferring data from a MMC to an NAND flash. According to the present invention, during the asynchronous bad block management, the write request at a bad block manager are queued and return success back to a file system. The bad block manager executes the queued request in a separate task (or different context than file system).

However, since the NAND can return error on a bad block from erase or program operation, the bad block manager needs to do a bad block management on the queued data and map it to a good block. The file system and the application can prepare the next write request when the bad block manager is programming the previous page. According to method of the present invention, the bad block management is not done synchronously blocking the file system till write and the bad block management is complete. The bad block management happens in a separate task.

After file system queues the request at the bad block manager queue, it can perform housekeeping operations on the request buffer containing both the page and spare area content. The housekeeping operations performed are cache management (e.g. in case of write, cleaning of cache lines holding the buffer to write back any dirty data to memory. In case of read, invalidate of the cache lines holding the buffer). In case of write, housekeeping operation includes the calculation of ECC and copy ECC to the buffer area containing the spare content. These operations are done in parallel to bad block manager programming the buffer from the previous request. As a result of this, after bad block manager completes a NAND page programming, it can immediately start with the transfer of the next page. If the host supports multiple NAND planes, then, bad block manager can start transfer of next buffer immediately after transferring the current buffer without waiting for the programming to finish. There is no limit on the amount of requests which can be queued at bad block manager.

Cache management typically includes cleaning of cache lines holding the bad block manager buffer to write any dirty data to a random access memory.

Accordingly, a first aspect of the invention provides a method for transferring data from a file system to a flash storage medium is provided, in which a bad block management process comprises:

queuing, at a bad block manager, one or more write requests, and receiving data associated with each of the one or more write requests and storing the received data in the bad block manager buffer;

performing cache management of data in the bad block manager buffer and subsequently returning a success status to the file system;

executing the one or more queued write requests in a separate task, wherein the executing comprises programming the received data to the flash storage medium during the bad block management process.

According to an embodiment of the present invention, a queue is added at the bad block management module. The Bad block manager queues the write requests received from the file system and later programs to the NAND flash with the bad block management. When the bad block manager received a write request, it copies the write buffer to its private queue buffer and queues the write request. the bad block manager returns back success to file system immediately.

According to an embodiment, if a bad block is encountered during the programming of the flash storage medium, then the method further comprises:

copying data programmed to the bad block to a good block;

programming further data from the bad block manager buffer to the flash storage medium.

According to some embodiments, the one or more write requests further comprise content for a spare area of a block of the flash storage medium.

According to some embodiments, in connection with the performing of the cache management, an error correction code corresponding to the one or more write requests and associated data is calculated from the bad block manager buffer and added to corresponding spare area of the bad block manager buffer.

According to some embodiments, when a queued write request is being actively executed, executing a further read request, write request, or erase request in the bad block manager buffer is blocked until the actively executed write request has finished.

According to some embodiments, when a size of an empty space in bad block manager is insufficient for receiving a write request, the bad block manager buffer is blocked for queuing further write requests.

According to some embodiments, if the bad block manager buffer contains a write request, then a read request or erase request following the write request is blocked from being queued in the bad block manager buffer.

According to some embodiments, if a number of bad blocks encountered exceeds a critical threshold, then disabling the bad block manager buffer and signaling a recoverable error to file system.

In another aspect, the invention provide a memory device for receiving data from a file system.

The memory device comprises:
a programmable flash storage medium;
a bad block manager having a bad block manager buffer for queuing one or more write requests and for receiving data associated with each of the one or more write requests and storing the received data in the bad block manager buffer, the bad block manager being operable to perform a bad block management process comprising:

performing cache management of data in the bad block manager buffer and subsequently returning a success status to the file system; and executing the one or more queued write requests in a separate task, wherein the executing comprises programming the received data to the flash storage medium.

Various embodiments of the device are configured to perform the further steps disclosed in relation to the first aspect of the invention.

Figure 5:
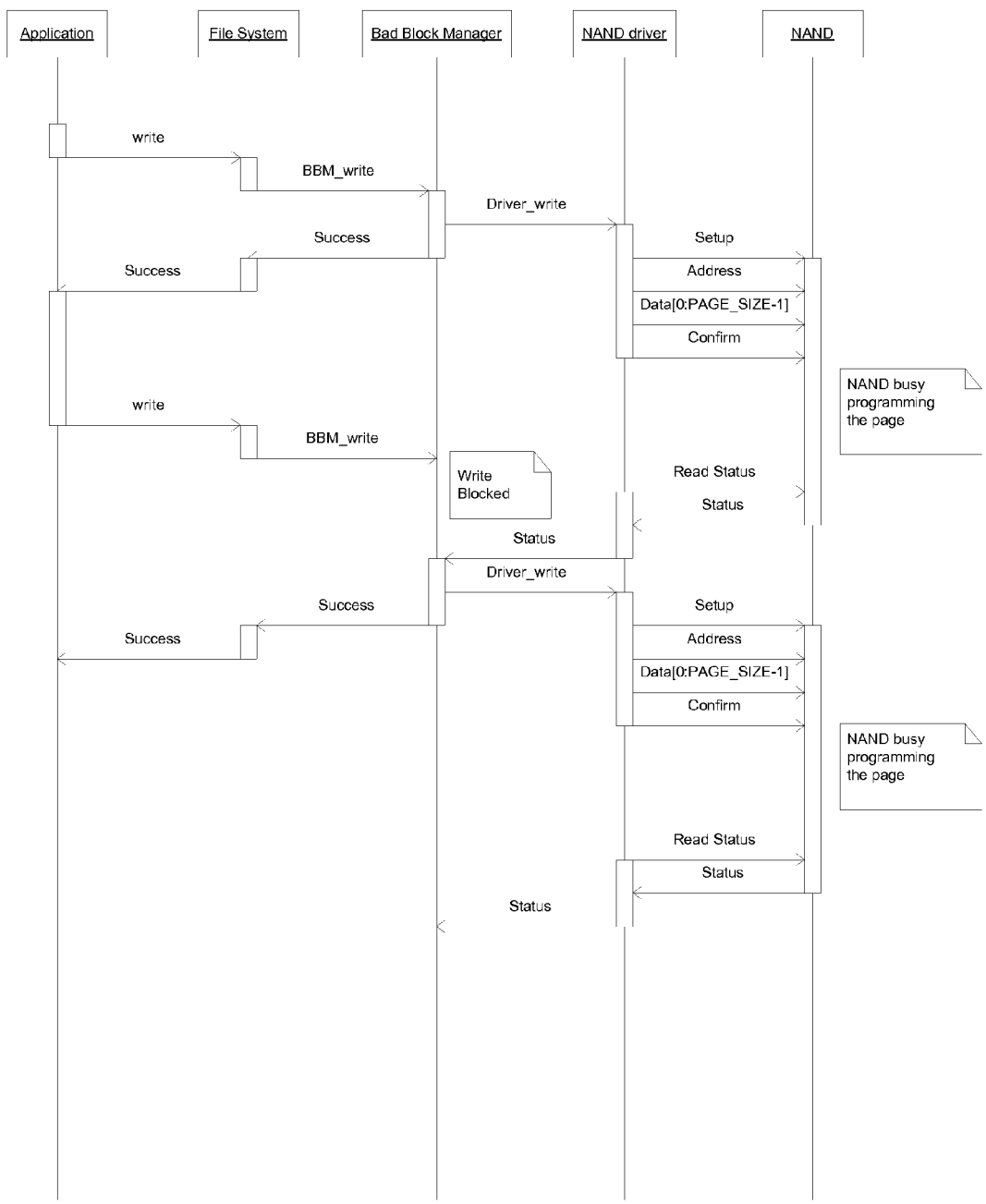
FIG. 5 illustrates a sequence when there is no bad block encountered when writing the queued request according to an embodiment of the present invention.

FIG. 5 illustrates a sequence according to yet another embodiment of the present invention, when there is no bad block encountered when writing the queued request.

Figure 6:
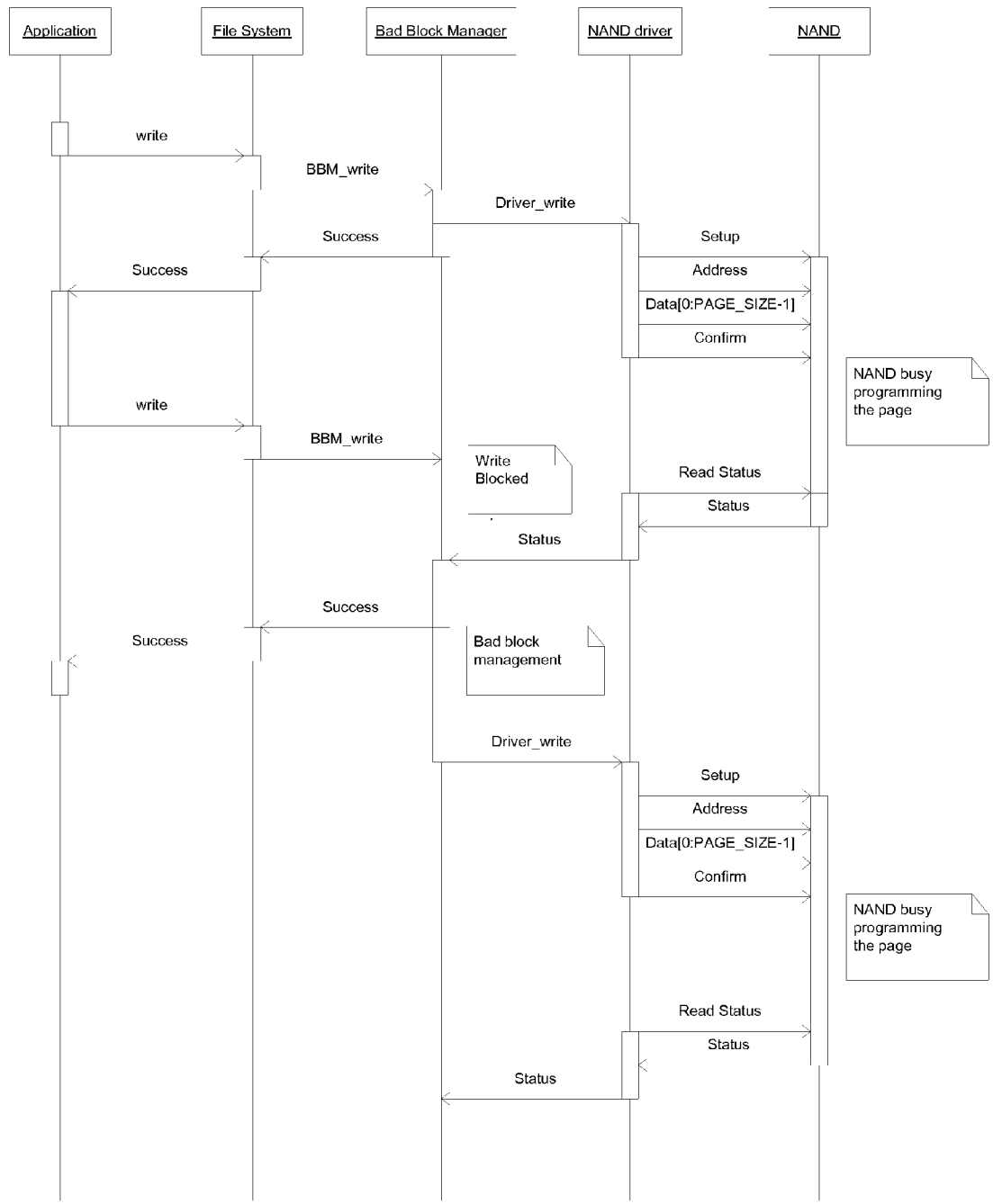
FIG. 6 illustrates a sequence when there is a bad block encountered when writing the queued request according to an embodiment of the present invention.

FIG. 6 illustrates a sequence according to yet another embodiment of the present invention, when there is a bad block encountered when writing the queued request.

Figure 7:
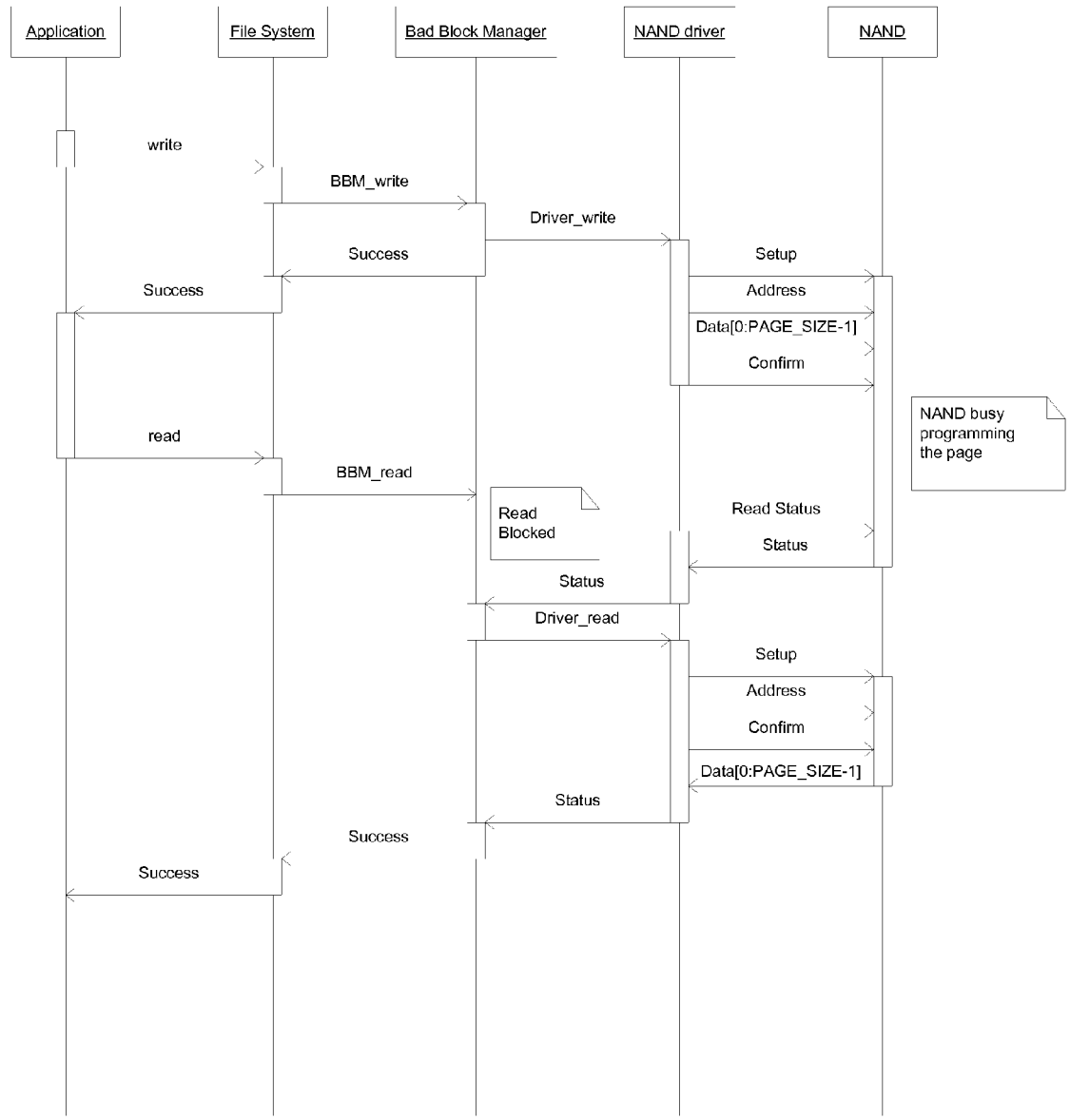
FIG. 7 illustrates read request getting blocked during ongoing write operation according to an embodiment of the present invention.

When the bad block manager is handling a queued write request, if there is any other read, write or erase request then the request is blocked till the queued write request is handled completely. Such an example of a read request getting blocked is illustrated in FIG. 7.

If the number of bad blocks encountered by bad block manager exceeds a threshold (typically the maximum bad block defined by NAND manufacturer or reserved number of blocks) then bad block manager disables the queue feature. Any program or erase error from NAND after this point is reported as EIO error to file system, which in turn makes the storage as read-only.

According to an embodiment, the present invention is independent of the way bad block management system/algorithm is implemented and it can be applied to any bad block management system/algorithm.

According to yet another embodiment of the present invention, the placement of bad block manager within file system or driver or as an independent entity is not relevant and the present invention applies whichever way bad block management is done The present invention achieves better overlap of application, file system operation with NAND programming. In the case of MMC to NAND throughput, it provides a throughput gain over 20%. In case of a streaming write, i.e. when continuously writing to file system from RAM, the throughput gain was more than 40%.

It should be appreciated that the invention is illustrated assuming that the system is a multi-tasking or multi-processor system. If the underlying system does not support this then the sequence chart may differ. However, the invention is valid for any type of system.

The invention claimed is:

1. A method for transferring data from a file system to a flash storage medium, wherein the method includes a bad block management process comprising:
   queuing, at a bad block manager buffer, one or more write requests, and receiving data associated with each of the one or more write requests and storing the received data in the bad block manager buffer;
   performing cache management of data in the bad block manager buffer and subsequently returning a success status to the file system;
   executing the one or more queued write requests in a separate task, wherein the executing comprises programming the received data to the flash storage medium during the bad block management process, wherein if a bad block is encountered during the programming of the flash storage medium, then
      copying data programmed to the bad block to a good block; and
      programming further data from the bad block manager buffer to the flash storage medium; and
   wherein if the bad block manager buffer contains a write request, then a read request or erase request following the write request is blocked from being queued in the bad block manager buffer.

2. A method in accordance with claim 1, wherein the one or more write requests further comprise content for a spare area of a block of the flash storage medium.

3. A method in accordance with claim 2, wherein in connection with the performing of the cache management, an error correction code corresponding to the one or more write requests and associated data is calculated from the bad block manager buffer and added to corresponding spare area of the bad block manager buffer.

4. A method in accordance with claim 1, wherein when a queued write request is being actively executed, executing a further read request, write request, or erase request in the bad block manager buffer is blocked until the actively executed write request has finished.

5. A method in accordance with claim 1, wherein when a size of an empty space in the bad block manager buffer is insufficient for receiving a write request, the bad block manager buffer is blocked for queuing further write requests.

6. A method in accordance with claim 1, wherein if a number of bad blocks encountered exceeds a critical threshold, then disabling the bad block manager buffer and signaling an error to the file system.

7. A memory device for receiving data from a file system, the memory device comprising:
   a programmable flash storage medium;
   a bad block manager having a bad block manager buffer for queuing one or more write requests and for receiving data associated with each of the one or more write requests and storing the received data in the bad block manager buffer, the bad block manager being operable to perform a bad block management process comprising:
      performing cache management of data in the bad block manager buffer and subsequently returning a success status to the file system; and
      executing the one or more queued write requests in a separate task, wherein the executing comprises programming the received data to the flash storage medium, wherein if a bad block is encountered during the programming of the flash storage medium, then the bad block management process comprises
         copying data programmed to the bad block to a good block; and
         programming further data from the bad block manager buffer to the flash storage medium, and
      wherein if the bad block manager buffer contains a write request, then a read request or erase request following the write request is blocked from being queued in the bad block manager buffer.

8. A memory device in accordance with claim 7, wherein the one or more write requests further comprise content for a spare area of a block of the flash storage medium.

9. A memory device in accordance with claim 8, wherein in connection with the performing of the cache management, an error correction code corresponding to the one or more write requests and associated data is calculated from the bad block manager buffer and added to corresponding spare area of the bad block manager buffer.

10. A memory device in accordance with claim 7, wherein when a queued write request is being actively executed, executing a further read request, write request, or erase request in the bad block manager buffer is blocked until the actively executed write request has finished.

11. A memory device in accordance with claim 7, wherein when a size of an empty space in the bad block manager buffer is insufficient for receiving a write request, the bad block manager buffer is blocked for queuing further write requests.

12. A memory device in accordance with claim 7, wherein if a number of bad blocks encountered exceeds a critical threshold, then disabling the bad block manager buffer and signaling an error to the file system.

13. A method in accordance with claim 1, wherein the file system prepares a next write request when the bad block manager is programming received data related to a previously queued write request.

14. A method in accordance with claim 1, wherein for each of the one or more write requests, an indication of success is returned after the write request is queued and prior to execution of the write request.

15. A memory device in accordance with claim 7, wherein the file system is configured to prepare a next write request when the bad block manger is programming received data related to a previously queued write request.

16. A memory device in accordance with claim 7, wherein for each of the one or more write requests, an indication of success is returned after the write request is queued and prior to execution of the write request.

* * * * *